United States Patent [19]
Piersma et al.

[11] 3,801,398
[45] Apr. 2, 1974

[54] METHOD AND APPARATUS FOR MANUFACTURING TIRE INNER TUBES WITH AIR VALVES, AND TIRE INNER TUBES WITH AIR VALVE MANUFACTURED BY APPLICATION OF THE METHOD

[75] Inventors: Leonardus Jacovus Piersma, Ede; Albertus Frederikus Siemes, Doetinchem, both of Netherlands

[73] Assignee: N.V. Rubberfabriek Vraderstein, The Hague, Netherlands

[22] Filed: Oct. 13, 1971

[21] Appl. No.: 188,842

[30] Foreign Application Priority Data
Oct. 14, 1970 Netherlands .................... 7015092

[52] U.S. Cl. .................. 156/120, 29/430, 156/118
[51] Int. Cl. ........................................... B29h 15/00
[58] Field of Search ...... 29/430, 429, 428; 156/118, 156/120, 122; 72/185

[56] References Cited
UNITED STATES PATENTS

| | | | |
|---|---|---|---|
| 3,346,948 | 10/1967 | Henning | 29/430 |
| 3,535,780 | 10/1970 | Berger | 29/430 |
| 3,543,374 | 12/1970 | McConnell | 29/429 |
| 2,388,652 | 11/1945 | George et al. | 156/120 |
| 3,396,451 | 8/1968 | Di Margio et al. | 72/185 |
| 2,070,525 | 2/1937 | Eberhard | 156/120 |

Primary Examiner—Charles W. Lanham
Assistant Examiner—James R. Duzan
Attorney, Agent, or Firm—McGlew and Tuttle

[57] ABSTRACT

This invention relates to tire inner tubes, to a mechanised and simplified method, and to an apparatus for manufacturing tire inner tubes with air valves in which a conveyor carries tubing portions of an extruded tubing of rubber or the like along apparatuses for forming holes in the tubing portions and for positioning and securing air valves over the holes, the speed and relative movements of the conveyor and apparatuses being adjusted and controlled such that the apparatuses execute their operations within the length of time that expires between each passage of a length of inner tube, and in which the tubing portions are cut off from said tubing before or after the holes have been formed and the air valves have been secured.

11 Claims, 3 Drawing Figures

PATENTED APR 2 1974  3,801,398

METHOD AND APPARATUS FOR MANUFACTURING TIRE INNER TUBES WITH AIR VALVES, AND TIRE INNER TUBES WITH AIR VALVE MANUFACTURED BY APPLICATION OF THE METHOD

FIELD AND BACKGROUND OF THE INVENTION

The present invention relates to a method for manufacturing tire inner tubes with an air valve, in which method a tubing is extruded from natural rubber or synthetic material, a hole is formed in each tubing portion to be later formed into a tire inner tube, an air valve is secured to each tubing portion over the hole, and the ends of the cut-off tubing portion are joined to form a tire inner tube.

In a known method of this type, tubing portions each having the length of a tire inner tube are cut off from the tubing and thereafter are usually conveyed to a working room in which the holes in the tubing portions are formed and the air valves are secured and the ends of each tubing portion are joined. This known method requires rather much handwork and transport.

SUMMARY OF THE INVENTION

The present invention intends to avoid handwork in a method as mentioned above and to reduce the transport of the tubing portions, in other words to mechanise, simplify and accelerate the method.

The method according to the present invention is characterized in that the speed at which a conveyor carries the tubing portions of the extruded tubing along apparatuses for forming the hole and for positioning and securing the air valve over the hole is adjusted in such a way, and also the relative movements of these apparatuses and the conveyor are controlled in such a way, that the apparatuses execute the operations within the length of time that expires between each passage of a length of inner tube and each cut-off, if any, of a tubing portion.

The holes are formed in the tubing portions in the known way preferably by a hollow punch and by means of vacuum, a wall portion being removed from the tubing portion by suction, and preferably air valves with rubber bases are used, the base being secured to the outer side of the tubing portion, over the hole. The present invention is not restricted to these possibilities. A rubber base results in a strong joint during vulcanising, particularly when the air valve is secured immediately after the extrusion of the non-vulcanised tubing which is still warm then. Further, by securing the air valve base to the outer side of the tubing portion it is superfluous to make special arrangements, like for instance an anvil to be secured into the interior of the tubing portion for retaining an air valve to be secured from inside (vide for the use of such an anvil US Pat. No. 1,768328.

A preferred embodiment of the method according to the present invention is characterized in that the apparatuses are periodically moved along in the direction of travel of the conveyor, at the same speed as the tubing on the conveyor, and the apparatuses execute their operations while moving along.

After the apparatuses have executed their operations, they are returned to their initial position in an accelerated way.

The apparatuses may be arranged one behind the other, seen in longitudinal direction of the conveyor. It is also possible to have a hollow punch, which forms the hole in the tubing portion by vacuum, operate through an air valve which is positioned and secured in the air valve positioning and securing apparatus. In the latter case there is no free choice of the diameter of the hole to be formed.

In case the apparatuses are arranged one behind the other in longitudinal direction of the conveyor, an embodiment of the method suitable for practice is characterized in that, after the hole is formed in the tubing portion, the air valve positioning and securing apparatus is brought above the hole by moving the air valve positioning and securing apparatus into the direction of the hole at a speed which is greater than the speed of the moving conveyor. Herewith, the air valve positioning and securing apparatus is positioned at the supplying side of the tubing and the apparatus forming the hole in the tubing portion is positioned further away from the supplying side. When the air valve positioning and securing apparatus is positioned further away from the beginning of the conveyor than the hole forming apparatus, then the air valve positioning and securing apparatus can be brought above the formed hole by moving the air valve positioning and securing apparatus at a speed which is less than the speed of the moving conveyor. In both cases, one has a free choice of the diameter of the hole.

The tubing portions can be cut off before or after the hole is formed and the air valve is secured. The latter possibility is preferred, in view of a gain of space for the apparatus. This means that, during forming the hole and securing the air valve, the tubing portions have not yet been separated from the tubing.

Another characterizing feature of the method according to the present invention is that the air valves, when provided with an adhesive at their base, are transmitted to the air valve positioning and securing apparatus. As an example of an adhesive, a solution is mentioned, which particularly is used when the base is made from rubber.

The present invention also includes tire inner tubes with air valve secured thereto, which tubes are manufactured by application of the above described method.

This invention also includes a reliably operating apparatus for carrying out the method according to the present invention. This apparatus is characterized by a conveyor for conveying the tubing, a carriage which is supported on a frame and is movable parallel to the conveyor, the carriage carrying an apparatus for forming a hole, an air valve positioning and securing apparatus and a cutting apparatus, and the carriage being adapted to be driven from the conveyor by means of a disengageable coupling. The carriage and the various apparatuses can operate pneumatically, hydraulically, electrically, or in any other suitable way.

According to another characterizing feature, the present apparatus comprises means adapted to move the air valve positioning and securing apparatus parallel to the conveyor at a speed which is different from the speed of the conveyor, so that said air valve positioning and securing apparatus positions an air valve straight above the formed hole in the tubing portion. The speed depends on the mutual position of the apparatuses on the carriage. This means can be realised structurally in many ways. One of the possibilities is elucidated herebelow in the description of an embodiment of the present apparatus.

According to another characterizing feature, the apparatus according to the invention comprises an apparatus arranged beside the conveyor, this apparatus providing the base of the air valves with an adhesive and transferring said valves to the air valve positioning and securing apparatus by means of a belt moving step by step perpendicularly to the conveyor. It has been determined that, when a solution is used as an adhesive and air valves having a rubber base are applied, the solution can sufficiently dry upon the rubber base before the air valves are secured to the tubing portions. The time which is necessary for drying should not be calculated in the length of time expiring between each cut-off of a tubing portion from the tubing.

With the method and apparatus according to the present invention, it is possible to operate at the same time with more than one tubing. When a plurality of tubings are operated at the same time, the tubings are positioned one beside the other and conveyed on the conveyor, while providing for each tubing, a number of apparatuses for forming the holes and for positioning and securing air valves, and a common cutting apparatus.

DESCRIPTION OF THE PREFERRED EMBODIMENT

Figure 1:
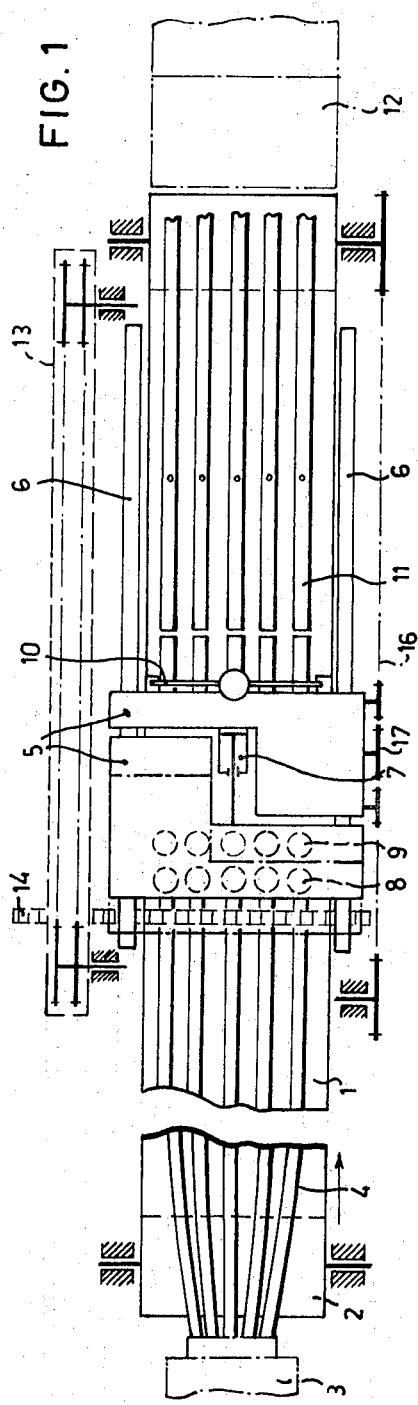
FIG. 1 is a schematic top plan view of the apparatus.

With reference to the schematic drawing an embodiment of the apparatus according to the present invention is elucidated. This embodiment serves as an example to which the present invention is not restricted. In this embodiment five tubings are operated at the same time.

In the embodiment it is assumed that the tubings come immediately from an extrusion apparatus. The invention is not restricted thereto and includes also the possibility that the extruded tubing(s) are supplied to the apparatus from a reel.

Further the apparatus which is chosen as example is extruded in such a way that an air valve apparatus and a hole forming apparatus are positioned one behind the other, with the air valve apparatus closest to the supply end of the conveyor.

The apparatus comprises an endless horizontal conveyor belt 1 which is guided over rollers 2. The extrusion apparatus 3 delivers five parallel tubings 4 from natural rubber or synthetic material to the upper portion of the conveyor. The conveyor conveys the tubings in the direction of the carriage 5 and carries them underneath this carriage. Carriage 5 is reciprocable parallel to the conveyor on two parallel horizontally positioned guide rods 6. In fact, the carriage comprises two parts which are positioned one behind the other, which parts are connected by a two-position cylinder 7. The foremost part of the carriage carries five air valve positioning and securing apparatuses 8 positioned in a row and five apparatuses 9 for forming a hole in the tubings by means of vacuum. For each tubing, an apparatus 8 and an apparatus 9 are provided, the two apparatuses being positioned one behind the other in longitudinal direction of the conveyor, with the apparatus 8 closer to the supply side of the conveyor belt 1 then the apparatus 9. At the rear side of the other part of the carriage, a cutting apparatus is mounted this cutting apparatus comprising a cutting knife 10 extending transversely to the conveyor belt. Each time the cutting apparatus cuts five tubing portions 11 from the tubings, with each tubing portion being provided with an air valve. Tubing portions 11 are transferred to a delivery conveyor 12 at the delivery end of the conveyor belt 1. The ends of each tubing portion are joined, so that an inner tube is made which is vulcanised.

Further the apparatus comprises an apparatus 13 arranged alongside the conveyor belt 1, apparatus 13 providing the rubber base of the air valves with a solution and transmitting the valves to the air valve positioning and securing apparatuses 8 through a horizontal conveyor belt 14. The belt 14 is perpendicular to the conveyor belt 1 and stops for a moment each time that the air valves are transmitted to the air valve positioning and securing apparatuses 8. This means that the belt 14 is moved step by step.

Figure 2:
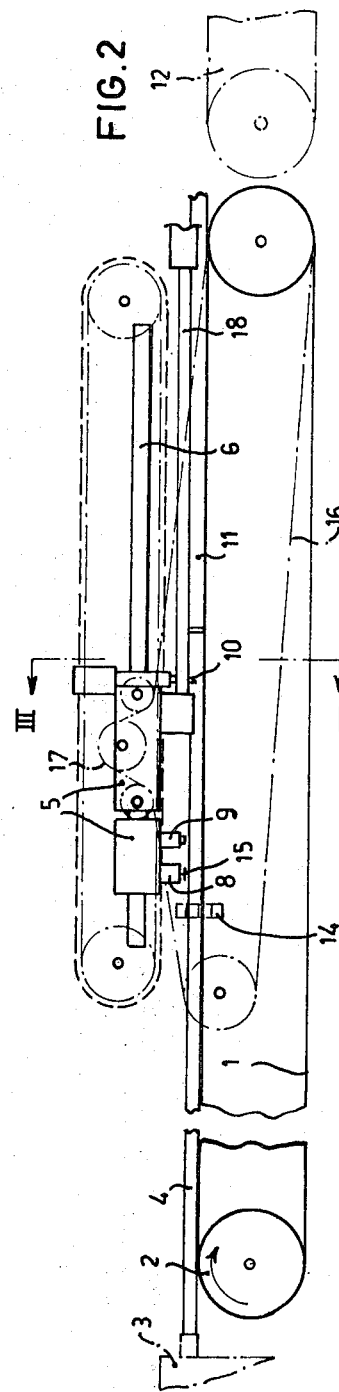
FIG. 2 is a schematic side elevation view of the apparatus.
Figure 3:
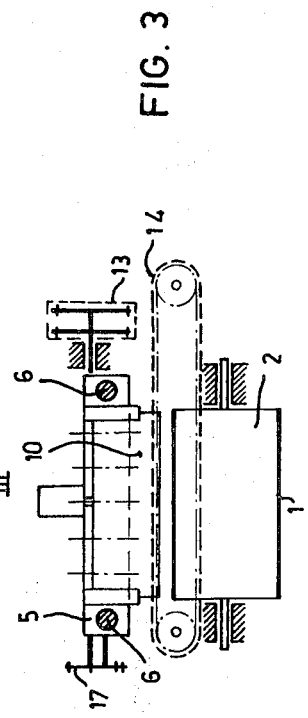
FIG. 3 is a schematic cross sectional view of the apparatus taken on the line III—III of FIG. 2.

In FIG. 2 an air valve 15 is indicated schematically, which valve is positioned into an air valve positioning and securing apparatus 8. The base of air valve 15 is directed downwardly and the air valve is secured to the outer wall of the tubing over the hole formed in the tubing and compressed in such a way that the hole and the passage in the air valve are in register (in line with each other).

The carriage 5 is driven from the conveyor belt 1 by a chain driving gear 16, a gear 17 of which can be engaged and disengaged with respect to the carriage by means of an engageable and disengageable coupling. In which way this driving takes place is elucidated herebelow.

The air valve supply belt 14 is an endless horizontal conveyor belt, the returning lower part of which passes between the two portions of the conveyor belt 1. Belt 14 does not reciprocate with the carriage 15.

The working of the apparatus which comprises the above-mentioned parts will now be briefly described.

The speed at which the tubings 4 are conveyed by the conveyor belt 1 along the apparatuses 8, 9 and 10 is adjusted in such a way, and the relative movements of these apparatuses and the conveyor belt are controlled in such a way, that the apparatuses 9 form holes in the tubings and the apparatuses 8 position and secure air valves over the holes within the length of time elapsing between two successive cut-offs of tubings 11 of a length almost corresponding with the peripheral length of the tire inner tubes to be manufactured. The apparatuses execute their operations while periodically moving along in the direction of travel of the conveyor belt 1, at the same speed as the conveyor belt and the tubings positioned thereon. During moving along, the holes are formed, the air valves are positioned and secured and the tubing portions are cut off. After the holes have been formed in the tubings, the air valve positioning and securing apparatuses 8 are brought straight above the holes by moving the air valve positioning and securing apparatuses in the direction of the holes at a speed which is greater than the speed of the moving conveyor belt 1. The air valve positioning and securing apparatuses 8 "overtake" (come up with) the holes. One and another is possible because the carriage 5 comprises the two parts which are movable with respect to each other by means of the two-position cylinder 7. Such "overtaking" takes place by the cylinder 7 moving the foremost part of the carriage from the position indicated by dotted lines in FIG. 1 at an increased speed to the position indicated by uninterrupted lines. During this "overtaking" the rear part of the carriage keeps running at the same speed as the conveyor belt 1. The pneumatically operated cylinder 7 also causes the two parts of the carriage to return in their initial position.

After the air valves are positioned and compressed on the tubings by the apparatuses 8 and the carriage 5 has arrived at the end of its stroke of motion on the guide rods 6, five tubing portions 11 are cut off by the cutting apparatus 10 at the same time.

As remarked before, the carriage 5 is driven from the conveyor belt 1 through the chain driving gear 16 and the gear 17. In case the carriage on the guide rods 6 is moved to the right (vide FIG. 1 and 2), the gear 17 is engaged to the carriage by the coupling, so that carriage 5 is moved along. When the carriage is returned to its initial position at the end of its working stroke, the coupling is disengaged and the connection with the gear 17 is removed. The carriage is then returned to its initial position by the pneumatic system 18 at a greater speed.

What is claimed is:

1. In a method of manufacturing a tire inner tube, of material such as natural rubber or synthetic resin, with the inner tube having an air valve, by extruding a continuous tubing of the material, forming a respective hole in each length of tubing to be later formed into an inner tube, securing a respective air valve over the hole in each such length of tubing and joining the opposite ends of each length to each other to form a respective inner tube; the improvement comprising carrying the continously extruded tubing past hole-forming and air valve positioning and securing apparatuses at the speed of extrusion of the tubing; moving the apparatuses with and relatively to the tubing during the hole-forming and air valve positioning and securing operations; and coordinating the relative movements of the tubing and the apparatuses with the speed of extrusion of the tubing in a manner such as to effect the hole-forming and air valve positioning and securing operations, for each respective length, during the time required for the respective length, moving at the speed of extrusion of the tubing, to pass completely by a predetermined point.

2. In a method of manufacturing a tire inner tube, the improvement claimed in claim 1, including periodically moving the apparatuses in the direction of travel of the tubing at the same speed as the continuous tubing; and performing the hole-forming and air valve positioning and securing operations during such movement of the apparatuses.

3. In a method of manufacturing a tire inner tube, the improvement claimed in claim 2, including moving a cutting apparatus periodically in the direction of travel of the tubing at the same speed as the continuous tubing to sever the respective lengths from the continuous tubing.

4. In a method of manufacturing a tire inner tube, the improvement claimed in claim 1, including the step of, after formation of the hole in a respective length, moving the air valve positioning and securing apparatus into alignment with the formed hole by moving the air valve positioning and securing apparatus in the direction of the formed hole at a speed greater than that of the tubing.

5. In a method of manufacturing a tire inner tube, the improvement claimed in claim 1, including initially applying an adhesive to the base of each air valve; and then transporting the air valve to the air valve positioning and securing apparatus.

6. In a method of manufacturing a tire inner tube, the improvement claimed in claim 1, including, after formation of a hole in a respective length of tubing and securing an air valve over the hole, severing the respective length from the continuous tubing.

7. In a method of manufacturing a tire inner tube, the improvement claimed in claim 1, including securing the base of each air valve to the outer surface of the respective length of tubing over the associated formed hole therein.

8. In apparatus for manufacturing a tire inner tube, of material such as natural rubber or synthetic resin, with the inner tube having an air valve, by extruding a continuous tubing of the material, forming a respective hole in each length of tubing to be later formed into an inner tube, securing a respective air valve over the hole in each such length of tubing, severing the respective lengths from the continuous tubing and joining the opposite ends of each length to each other to form a respective inner tube; the improvement comprising, in combination, a conveyor receiving and conveying the continuously extruded tubing at the speed of extrusion of the tubing; a frame; a carriage supported on said frame for movement parallel to said conveyor, hole-forming apparatus, air valve positioning and securing apparatus, and a cutting apparatus on said carriage; and a disengageable coupling operable to couple said carriage to said conveyor for driving of said carriage by said conveyor during the hole-forming and air valve positioning and securing operations.

9. In apparatus for manufacturing a tire inner tube, the improvement claimed in claim 8, including means operable to move said air valve positioning and securing apparatus parallel to said conveyor at a speed different from that of said conveyor to position an air valve in alignment with the formed hole in each tubing length.

10. In apparatus for manufacturing a tire inner tube, the improvement claimed in claim 8, including a further apparatus arranged alongside said conveyor and operable to apply an adhesive to the bases of the air valves; and a belt moving step by step perpendicular to said conveyor and transferring the valves from said further apparatus to said air valve positioning and securing apparatus.

11. A tire inner tube, with an air valve, as manufactured by the apparatus of claim 8.

* * * * *